March 29, 1966 N. HABIB 3,243,787

PULSE GENERATING SYSTEM

Filed Nov. 13, 1961

INVENTOR
N. HABIB

BY G. E. Hirsch Jr.
ATTORNEY

United States Patent Office 3,243,787
Patented Mar. 29, 1966

3,243,787
PULSE GENERATING SYSTEM

Nissin Habib, Succasunna, N.J., assignor to Bell Telephone Laboratories, Incorporated, New York, N.Y., a corporation of New York Filed Nov. 13, 1961, Ser. No. 152,096
4 Claims. (Cl. 340—174)

Figure 1:
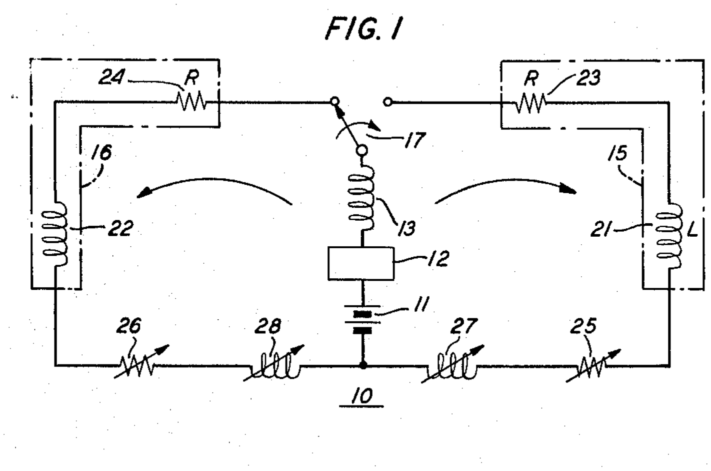

This invention relates to pulse generating apparatus and, more particularly, to high speed, high current pulse generators for driving magnetic memory lines and the like.

The ever-increasing demand for higher data processing rates has led to the development of faster magnetic memory devices and stores. This, in turn, has created a need for improved high current, high speed pulse generating apparatus for driving memory lines of such devices.

As is well known, magnetic memory lines are generally driven either directly, in small capacity memory systems, or indirectly through an access matrix, for example, one comprised of ferrite cores, in large capacity memory systems. In either case, the magnetic memory often exhibits primarily only series inductance and resistance. A common characteristic of such lines is that they normally require relatively high current pulses for reliable operation. In addition, when such lines are incorporated in high speed memory systems, the high current pulses must also exhibit extremely fast rise and fall times. The design and construction of circuits capable of handling such pulses have proven quite difficult.

Prior art memory systems have relied principally on "on-off" techniques for driving current pulses into a magnetic memory line. Disadvantageously, the rise and fall times of the current pulses in such systems are usually a direct function of the time constant of the line. Further, the pulse driver or generator in such systems must exhibit a frequency response at least compatible with the desired rise and fall times of the current pulses. These operating factors, inherently involved in prior on-off systems, make memory storage requirements, i.e., those relating to large current pulses and extremely fast rise and fall times, very difficult to achieve without severe penalties in circuit economy. In addition, accurate current regulation of the pulse amplitude is also very difficult to achieve in the aforementioned systems because of circuit transient effects.

Accordingly, it is an object of this invention to permit a magnetic memory line (or store) to be driven by large current pulses having rise and fall times substantially shorter than normally dictated by the time constant of the line itself.

It is an additional object of this invention to regulate accurately pulse amplitudes without requiring an expensive and complex pulsed current regulator.

It is an additional object of this invention to increase the effective bandwidth of the pulse generator circuit to accommodate active pulse driving elements having a lower cutoff frequency than would normally be required for a given speed requirement.

These and other objects of the invention are attained in accordance with one illustrative embodiment by means of a current pulse generating system comprising a voltage source, a regulator, an inductor of large reactance and a switching circuit serially connected and arranged to drive selectively an active memory line comprising, for example, a magnetic "word" or "digit" line that exhibits primarily series inductance and resistance only.

In accordance with one aspect of the invention, a second line is also utilized which comprises a dummy load having circuit parameters chosen to match those of the active memory line.

A transistor flip-flop is preferably utilized to apply the driving current selectively to either the active or the dummy line. As will presently be seen, this form of balanced "current steering" between the two lines removes the speed limitations normally imposed by the active magnetic line parameters, effects circuit economies and improves current regulation of the pulses.

In accordance with another aspect of the invention, the voltage induced in the series inductance of the particular line being driven is utilized to provide a regenerative bias voltage which increases the switching speed of the flip-flop. More specifically, the unique regenerative switching employed provides an effective bandwidth increase which allows the use of transistors having a lower cutoff frequency than normally required for a given speed requirement.

A plurality of pulse generators may also be connected in tandem or in banks whereby current may be driven into any number of selected lines which together form a portion of an array comprised of a larger number of lines. Such an arrangement has particular application in small capacity computer systems wherein, for example, the memory is driven directly rather than through an access matrix.

Figure 2:
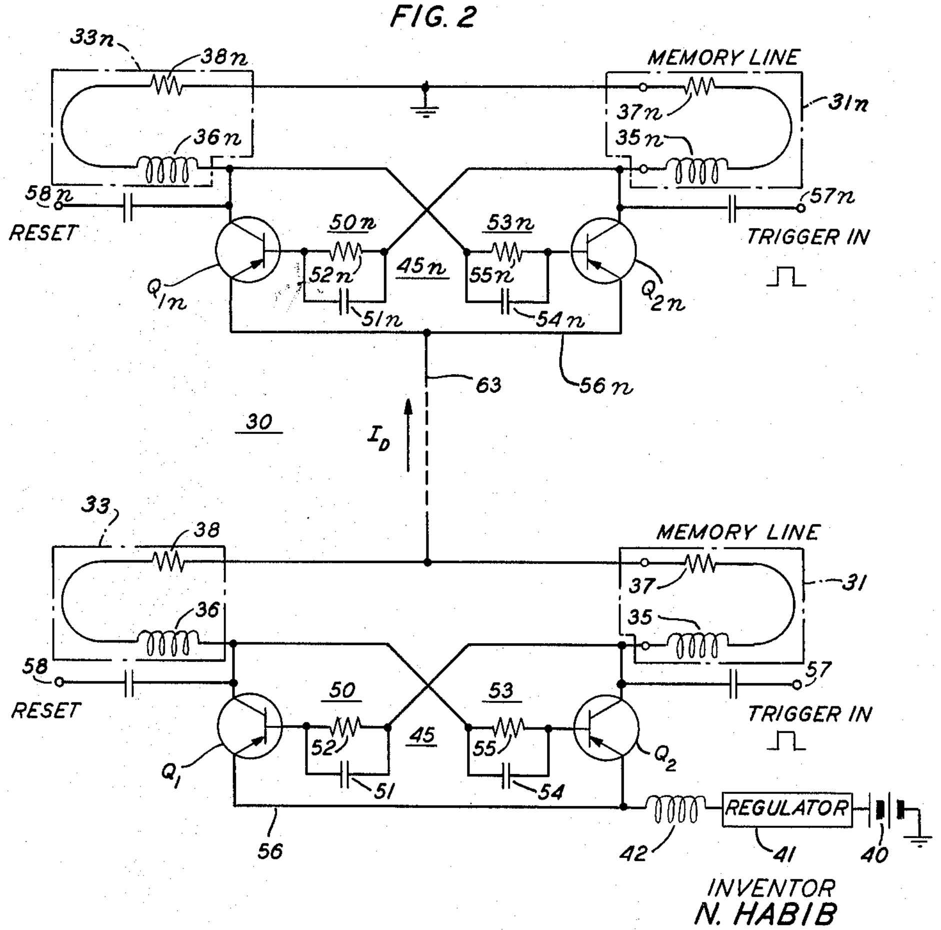

The invention will be more fully apprehended from the following detailed description of the preferred illustrative embodiments thereof, considered in conjunction with the appended drawing, in which:

FIG. 1 is a simplified schematic circuit diagram of a pulse generating system in accordance with the principles of the invention; and FIG. 2 is a more detailed schematic circuit diagram of a plurality of pulse generators connected in tandem embodying the principles of the invention.

Considering the drawings more particularly, FIG. 1 depicts in simplified schematic form a balanced "current steering" pulse generating system 10 comprising a voltage source 11, shown for purposes of illustration as a battery, a current regulator 12 and an inductor 13 of large reactance, all serially connected. These elements form the source of driving current selectively applied to an active magnetic memory line 15 and a dummy line 16, matched to active line 15, through an appropriate switching circuit 17, shown symbolically as a single-pole, double-throw switch.

The regulator 12 may comprise any well known type as, for example, a sensitive feedback amplifier. Of course, the voltage source and regulator may be combined in a single constant current source of any standard type. The active magnetic memory line 15 may take any one of a number of well known forms and be comprised of magnetic elements such as, for example, twistors, thin films, transfluxors, or inhibited fluxors. High current operated magnetic elements known as multi-aperture devices and Laddics utilized in computer logic circuits, are also to be understood as encompassed within the definition "memory line." Accordingly, the expression "memory line" includes magnetic or similar elements constructed not only for the storage of information, but also those constructed to perform various other functions, such as logic operations, in data processing or communications systems.

Magnetic memory lines generally exhibit primarily series inductance and resistance only. These circuit parameters are represented in the active and dummy lines of FIG. 1 by the inductors 21, 22 and resistors 23, 24, respectively. The purpose of the variable resistors 25, 26 and the variable inductors 27, 28, associated respectively with the active and dummy lines will be described in greater detail hereinafter.

An examination of the basic generating system 10 reveals that the regulator 12 operates with an effectively constant (balanced) load since it is always connected either to line 15, or to its matched counterpart 16. Thus, the unique current steering employed in the present invention gives rise to improved current regulation since the voltage source and regulator are operated continuously rather than intermittently. Concomitantly generating system 10 also makes possible circuit economics by minimizing the stringent circuit requirements normally imposed on a voltage source and regulator constructed to operate in an on-off rather than continuous manner. A more comprehensive discussion of these and other features and advantages of the embodiment depicted in FIG. 1 will follow a description of the more detailed pulse generating system depicted in FIG. 2.

System 30 of FIG. 2 comprises a tandem arrangement of two active memory lines 31, 31*n* and two dummy lines 33, 33*n*. While only two pairs of active dummy lines have been depicted in FIG. 2, it is to be understood that any number of such pairs of lines may be successively connected in tandem and selectively energized as required for a given system application. For this reason the upper pair of lines as well as the circuit elements associated therewith are identified by reference numerals followed by the letter *n* which signifies an unlimited series. The active and dummy lines are characterized by matched predetermined values of series inductance and resistance. Inductors 35, 35*n* and 36, 36*n* and resistors 37, 37*n* and 38, 38*n* represent the necessary values of inductance and resistance in the memory and dummy lines, respectively. A voltage source 40, a regulator 41 and an inductor 42 of large reactance are serially connected for driving any combination of the active and dummy memory line pairs connected in tandem.

A transistor flip-flop circuit 45 is associated with memory line 31 and dummy line 33 and a similar flip-flop circuit 45*n* is associated with memory line 31*n*, and dummy line 33*n*. Flip-flop 45 comprises two transistors $Q_1$, $Q_2$. The base of $Q_1$ is cross-coupled to the collector of $Q_2$ by a parallel network 50 comprising a capacitor 51 and a resistor 52. The base of $Q_2$ is similarly cross-coupled to the collector of $Q_1$ by the parallel network 53 comprising capacitor 54 and resistor 55. Other well known forms of flip-flop cross-coupling, such as those utilizing diodes or pure resistances may be similarly employed. The emitter of $Q_1$ is directly connected to the emitter of $Q_2$ through the common lead 56. While the flip-flop 45 has been shown in circuit configuration applicable for use with PNP transistors, the circuit counterpart for use with NPN transistors may be similarly employed.

As depicted, the flip-flop 45 is actuated by a symmetrical triggering. This form of triggering requires two distinct control pulses, i.e., two input signals, respectively applied, for example, to an input terminal 57 and a reset terminal 58. The necessary control pulses may be applied to the appropriate terminals for triggering and resetting in sequence, as for example, at opposite nodes of the flip-flop. Alternatively, any well known form of symmetrical triggering, or the incorporation of a built-in time constant may also be utilized to effect the necessary switching from one line to the other with only one control pulse input.

From a circuit standpoint, flip-flop 45*n* comprising transistors $Q_{1n}$ and $Q_{2n}$, is identical to flip-flop 45. The regulated current from source 40 is applied via the path comprising flip-flop 45, line 31 or 33 and lead 63 to flip-flop 45*n*. Lead 63 is dotted to indicate that driving current from a single source may be applied to any number of pairs of lines connected in tandem through a connection, for example, from the center tap of one pair of lines to the common emitter lead of a flip-flop associated with another pair of lines.

In accordance with an aspect of the invention, pulse generating system 30, as well as system 10 of FIG. 1, provides high speed memory accessing independently of the driven line time constant by reason of the following circuit feature: The large value of inductance of inductor 42, when suitably chosen, effectively "forces" a substantially constant amplitude current step function into the driven line. The rise and fall times of a current pulse into any particular line are therefore primarily a function of the switching speed of the driving element (preferably transistors) in the flip-flops. The current pulses tend to remain substantially constant as the large series inductance tends to oppose any change of driving current, such as could be caused by unbalanced lines or transistors, or undesired circuit transient effects.

In accordance with another aspect of the invention, the switching speed or resolving time of each flip-flop is increased over that otherwise realized with a given pair of transistors and associated circuit parameters. More specifically, the values of inductance and resistance in each pair of active and dummy lines are chosen or adjusted such that a predetermined value of induced voltage is produced in the series inductance of the particular line being driven. This voltage, at the moment the driving current is switched to the other line, biases the base of the transistor to be made conducting in a manner which increases the normal speed of turn-on initiated by a trigger pulse. Such induced or regenerative voltage is important in that the speed of turn-on of the transistors may be made a function of the unity gain frequency (approximately alpha cutoff) rather than a function of the beta cutoff. This follows since the base current of the nonconducting transistor at the instant of turn-on may be made approximately equal to the final or saturation value of collector current. An abrupt reduction in the difference between base and collector currents has the effect of substantially reducing the otherwise realized delay and rise times of a given transistor in going from a region of cutoff to a region of saturation. As a result, the type of regenerative switching employed in switching systems 10 and 30 provides an effective bandwidth increase which allows the use of transistors with a lower cutoff frequency than would normally be required for a given speed requirement.

The value of inductance utilized for effecting regenerative switching normally includes only the existing inductance built into the particular line employed. In certain applications, however, it may be desirable to incorporate both an auxiliary resistor and inductor of variable resistance and inductance, respectively, in series relation with each line for optimizing the switching speed of any given pair of driving elements utilized in the switching circuit. The variable resistors 25, 26 and the variable inductors 27, 28 in the active and dummy lines, respectively, of generating system 10 depicted in FIG. 1, serve such a function.

In operation, the respective flip-flops depend for stability on the low collector-to-emitter voltage of the saturated conducting (or on) transistor to reduce the base current of the nonconducting (or off) transistor to a point where the circuit gain is too low for regeneration. A positive step voltage, of sufficient magnitude, applied through the trigger input terminal 57 to the collector of $Q_2$ when off, for example, will effect a transition, i.e., turn $Q_1$ off and turn $Q_2$ on. The resulting low impedance emitter-to-collector path of $Q_2$ effects a shift in driving current from the dummy line to the active memory line. Conversely, a suitable positive step voltage applied through reset terminal 58 to the collector of $Q_1$ when off, will effect a shift in driving current from the active memory line to the dummy line.

In considering a specific mode of operation for the system 30 more particularly, assume, for purposes of illustration, that each line comprises a "word" line and that the various trigger terminals 57–57*n* sequentially are addressed by pulses so that information previously stored in each line may be "read" out. If each line is comprised of a plurality of ferrite cores, for example, then a single high current pulse applied to a given word line, such as to line 31 through $Q_2$, causes all information previously stored in that line to appear on predetermined energized output sensor lines associated respectively with the ferrite cores. Thus, each time terminal 57 is addressed with a low amplitude pulse, a high current pulse of constant amplitude is applied to word line 31. A suitable reset pulse applied to terminal 58, at the instant the address pulse ends, causes the driving current from source 40 to be transferred to the dummy line 33. When trigger terminal 57 is again addressed, the driving current is again rapidly transferred to the active word line 31. Thus, the driving current is switched to the dummy line only during those intervals during which the trigger terminal associated with the active line being "read" is not addressed by a pulse.

In high speed systems, the trigger terminals of each flip-flop normally are addressed by pulses at an exceedingly high repetition rate. Accordingly, it is essential that the driving current pulses be not only of high current amplitude but also exhibit extremely fast rise and fall times. In other words, the driving current must be transferred back and forth between the active and dummy lines of each pair at a rate at least as great as the address rate. Advantageously, the regenerative switching action of each driving circuit connected in tandem provides the necessary "snap-action" which allows the driving current to switch from the active line to the dummy line and vice versa in the requisite short intervals of time required for effective operation. Moreover, as the large inductance exhibited by inductor 42 in series with each circuit prevents any rapid rate of change of driving current during switching from one line to the other, the current pulses remain of substantially constant amplitude.

The unique form of balanced current steering embodied in the instant pulse generating systems is thus seen to give rise to the following features and advantages: (1) Circuit economy through the use of a continuously operated rather than pulsed current source and regulator, (2) improved current regulation through the use of an effectively constant (balanced) load, and a large inductance in series with the driving source, (3) pulse rise and fall times dependent only on the switching speed of the driving transistors in the flip-flops, and (4) permissible use of driving transistors exhibiting a lower cutoff frequency than normally required for a given speed requirement.

It is to be understood that the specific embodiments described herein are merely illustrative of the general principles of the instant invention. Numerous other structural arrangements and modifications may be devised in the light of this disclosure by those skilled in the art without departing from the spirit and scope of this invention.

What is claimed is:

1. Apparatus for driving a plurality of magnetic memory lines with a current pulse comprising a plurality of memory lines each one of which has a counterpart two terminal dummy load of substantially equal input impedance, switching means associated with each memory line having an input and two outputs for steering a current supplied to its input to either of the two outputs, means for connecting one side of each memory line to one terminal of its counterpart load, means for connecting one output of each switching means to the other side of its respective memory line and connecting the other output to the other terminal of the counterpart load, means for connecting a plurality of switching means and memory lines in a series having a first switching means and a last memory line with the intervening junctions of each memory line and its counterpart load connected to the input of the next switching means, a source of direct current having two terminals, a large inductor connected to one of the terminals of said current source, and means for connecting the input of the first switching means and the junction of the last memory line with its counterpart load between the inductor and the other terminal of said current source.

2. In combination, a plurality of magnetic memory lines each one of which has a counterpart dummy load of impedance substantially matching that of the memory line, a bistable transistor circuit associated with each memory line, each transistor circuit comprising a pair of transistors having collector, base and emitter electrodes and means for cross-connecting the collector and base electrodes of said transistors to form a regenerative feedback loop wherein said transistors assume mutually opposite operating states which they interchange in response to successive input switching pulses applied to selected electrodes thereof, means for interconnecting one terminal of each memory line to one terminal of its counterpart load, means for respectively connecting the collector electrodes of each bistable transistor circuit to the other terminals of the associated memory line and counterpart load, means connecting a plurality of bistable transistor circuits and associated memory lines in a series having a first transistor circuit and a last memory line with the intervening junctions of each memory line and its counterpart load connected to the emitter electrodes of the next transistor circuit in the series, a source of direct current having two terminals, a large inductance connected to one of the terminals of said current source, and means for connecting the first transistor circuit and the junction of the last memory line with its counterpart load between the inductance and the other terminal of said current source.

3. A pulse generating system for introducing high speed, high current pulses into an active magnetic memory line having adjustable means for establishing prescribed values of resistance and inductance therein, said generating system comprising constant driving current means including a voltage source, and an inductor serially connected, switching means for periodically connecting said driving current means to said active magnetic memory line, means for maintaining said driving current pulses in said active line substantially constant including an auxiliary line connected to said driving current means alternately with said active line, said auxiliary line having adjustable impedance characteristics which are matched to said active line, said switching means comprising a bistable voltage-dependent flip-flop having two driving elements, one of said elements being in a conducting state when the other is in a nonconducting state, means for triggering said flip-flop with pulse information applied to a first terminal of at least one of said driving elements, and means for increasing the switching speed of said flip-flop including the inductance of said active memory line and an inductor of corresponding value in said auxiliary line, the inductance in the momentarily driven line producing a regenerative induced voltage of sufficient magnitude to increase the bistable switching responsiveness of said flip-flop when applied to a second electrode terminal of the nonconducting element.

4. A pulse generating system in accordance with claim 3 further including means for connecting and supplying said driving current to a plurality of said generating systems arranged in tandem.

References Cited by the Examiner

UNITED STATES PATENTS

| | | | |
|---|---|---|---|
| 2,924,725 | 2/1960 | Blair | 307—88.5 |
| 3,047,737 | 7/1962 | Kolodin | 307—88.5 |
| 3,112,408 | 11/1963 | Kuhne | 307—88.5 |
| 3,148,357 | 9/1964 | Thornton | 307—88 |

IRVING L. SRAGOW, *Primary Examiner.*

J. W. MOFFITT, M. S. GITTES, *Assistant Examiners.*